United States Patent
Whitmyer, Jr.

(10) Patent No.: US 7,925,628 B2
(45) Date of Patent: *Apr. 12, 2011

(54) INTERNET-BASED DATA PROCESSING SYSTEM WITH ONSITE BACKUP

(75) Inventor: Wesley W. Whitmyer, Jr., Stamford, CT (US)

(73) Assignee: WhitServe LLC, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/620,143

(22) Filed: Nov. 17, 2009

(65) Prior Publication Data

US 2010/0070477 A1    Mar. 18, 2010

Related U.S. Application Data

(63) Continuation of application No. 11/223,335, filed on Sep. 9, 2005, now Pat. No. 7,647,364, which is a continuation of application No. 09/706,651, filed on Nov. 6, 2000, now Pat. No. 6,981,007, which is a continuation-in-part of application No. 09/610,709, filed on Jul. 7, 2000, now abandoned.

(60) Provisional application No. 60/143,093, filed on Jul. 9, 1999.

(51) Int. Cl.
   *G06F 17/00*   (2006.01)
(52) U.S. Cl. .................... 707/640; 707/652; 707/653
(58) Field of Classification Search ............. 707/640, 707/652, 653
   See application file for complete search history.

(56) References Cited

U.S. PATENT DOCUMENTS

| | | |
|---|---|---|
| 5,410,646 A | 4/1995 | Tondevold et al. |
| 5,634,052 A | 5/1997 | Morris |
| 5,649,196 A | 7/1997 | Woodhill et al. |
| 5,673,318 A | 9/1997 | Bellare et al. |
| 5,673,381 A | 9/1997 | Huai et al. |
| 5,696,901 A | 12/1997 | Konrad |
| 5,771,354 A | 6/1998 | Crawford |
| 5,812,398 A | 9/1998 | Nielsen |
| 5,890,165 A | 3/1999 | Boudrie et al. |
| 5,901,228 A * | 5/1999 | Crawford ............... 705/34 |
| 5,903,881 A | 5/1999 | Schrader et al. |
| 5,940,843 A | 8/1999 | Zucknovich et al. |
| 5,940,845 A | 8/1999 | Prager et al. |
| 5,956,733 A * | 9/1999 | Nakano et al. ............... 1/1 |
| 5,963,642 A | 10/1999 | Goldstein |
| 6,003,044 A | 12/1999 | Pongracz et al. |
| 6,032,119 A | 2/2000 | Brown et al. |
| 6,076,167 A | 6/2000 | Borza |
| 6,119,118 A | 9/2000 | Kain, III et al. |

(Continued)

OTHER PUBLICATIONS

Data Protection Services, LLC—Secure Online Backup—www.dataprotection.com —1996, 9pp. 1-4.

(Continued)

*Primary Examiner* — Miranda Le
(74) *Attorney, Agent, or Firm* — St. Onge Steward Johnston & Reens LLC

(57) ABSTRACT

A system for onsite backup of internet-based data is provided. The system includes a central computer, a client computer, a communications link between the central computer and the Internet, and a communications link between the client computer and the Internet. The system also includes at least one database containing a plurality of data records accessible by the central computer, each data record containing a client identification number. Software executing on the central computer receives a data backup request, and software executing on the central computer transmits the data backup to the client computer.

14 Claims, 3 Drawing Sheets

U.S. PATENT DOCUMENTS

| | | | |
|---|---|---|---|
| 6,289,347 | B1 | 9/2001 | Giroux |
| 6,289,426 | B1 * | 9/2001 | Maffezzoni et al. ........ 711/173 |
| 6,330,570 | B1 | 12/2001 | Crighton |
| 6,360,330 | B1 | 3/2002 | Mutalik et al. |
| 6,393,569 | B1 | 5/2002 | Orenshteyn |
| 6,411,943 | B1 | 6/2002 | Crawford |
| 6,453,325 | B1 | 9/2002 | Cabrera et al. |
| 6,457,012 | B1 | 9/2002 | Jatkowski |
| 6,487,561 | B1 | 11/2002 | Ofek et al. |
| 6,487,644 | B1 | 11/2002 | Huebsch et al. |
| 6,493,825 | B1 | 12/2002 | Blumenau et al. |
| 6,505,216 | B1 | 1/2003 | Schutzman et al. |
| 6,550,011 | B1 | 4/2003 | Sims, III |
| 6,571,280 | B1 | 5/2003 | Hubacher |
| 6,574,733 | B1 | 6/2003 | Langford |
| 6,615,327 | B1 | 9/2003 | Satoyama et al. |
| 6,615,349 | B1 * | 9/2003 | Hair ........................ 713/165 |
| 6,778,668 | B1 | 8/2004 | Nielsen |
| 6,785,786 | B1 | 8/2004 | Gold et al. |
| 6,880,008 | B1 * | 4/2005 | Yoneda ..................... 709/226 |
| 6,883,110 | B1 | 4/2005 | Goddard |
| 6,912,629 | B1 | 6/2005 | West et al. |
| 6,938,057 | B2 * | 8/2005 | Gusler et al. ............... 707/613 |
| 7,069,466 | B2 | 6/2006 | Trimmer et al. |
| 2004/0034811 | A1 | 2/2004 | Trimmer et al. |
| 2006/0053147 | A1 | 3/2006 | Wahlert et al. |

OTHER PUBLICATIONS

Microsoft—TechNet; "Accessing Heterogeneous Data with MS SQL Server 7.0"; Microsoft Corporation; http://technet.microsoft.com/en-us/library/cc917710(printer).aspx; (undated) 22 pages.

Microsoft—TechNet; "Fundamentals of SQL Server Architecture"; Microsoft Corporation; http://technet.microsoft.com/en-us/library/cc917569(printer).aspx; (undated) 29 pages.

Microsoft—TechNet; "Managing Clients"; Microsoft Corporation; http://technet.microsoft.com/en-us/library/cc917567(printer).aspx; (undated) 13 pages.

Microsoft—TechNet; "Managing Security"; Microsoft Corporation; http://technet.microsoft.com/en-us/library/cc917569(printer).aspx; (undated) 29 pages.

Microsoft—TechNet; "Managing Servers"; Microsoft Corporation; http://msdn.microsoft.com/en-us/library/cc917566(printer).aspx; (undated) 32 pages.

Microsoft SQL Server 7 Technical Articles; "Microsoft SQL Server 7.0 Query Processor"; Microsoft Corporation http://msdn.microsoft.com/en-us/library/aa226170(SQL.70,printer).aspx; Sep. 1998; 17 pages.

Microsoft SQL Server 7 Technical Articles; "Microsoft SQL Server 7.0 Replication Made Easy"; Microsoft Corporation http://msdn.microsoft.com/en-us/library/aa226171(SQL.70,printer).aspx; Jun. 8, 1999; 3 pages.

Microsoft SQL Server 7 Technical Articles; "Microsoft SQL Server 7.0 Security"; Microsoft Corporation http://msdn.microsoft.com/en-us/library/aa226173(SQL.70,printer).aspx; May 1998; 34 pages.

Microsoft SQL Server 7 Technical Articles; "Replication for Microsoft SQL Server Version 7.0"; Microsoft Corporation http://msdn.microsoft.com/en-us/library/aa226168(SQL.70,printer).aspx; Jul. 11, 1998; 13 pages.

Microsoft—TechNet; "Things to Consider When Building Commerce Solutions with Technologies"; Microsoft Corporation; http://technet.microsoft.com/en-us/library/bb687375(printer).aspx; Aug. 1999; 53 pages.

* cited by examiner

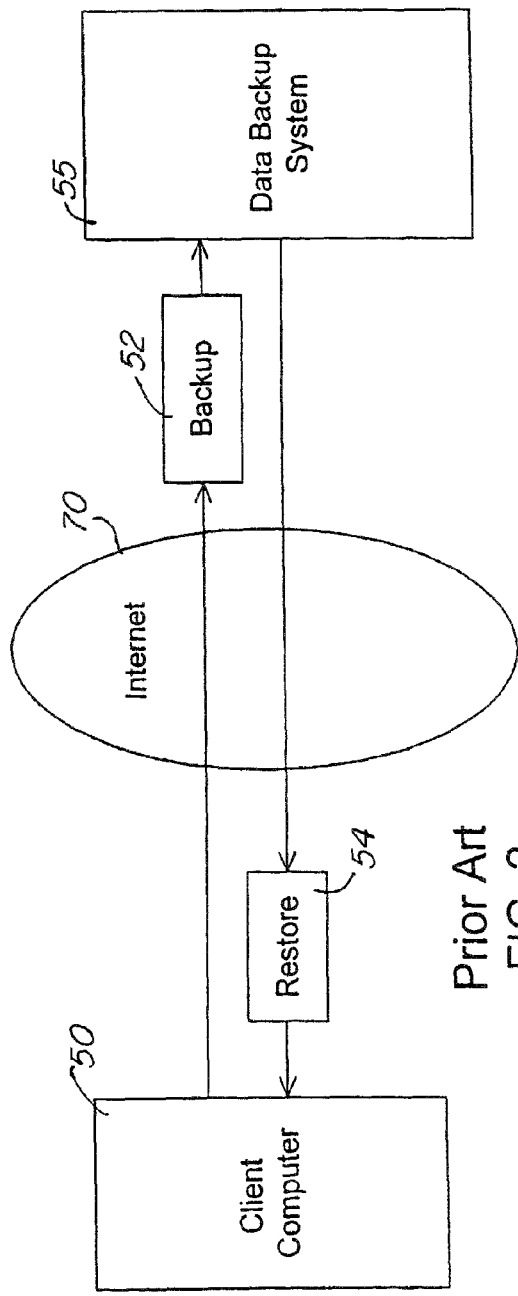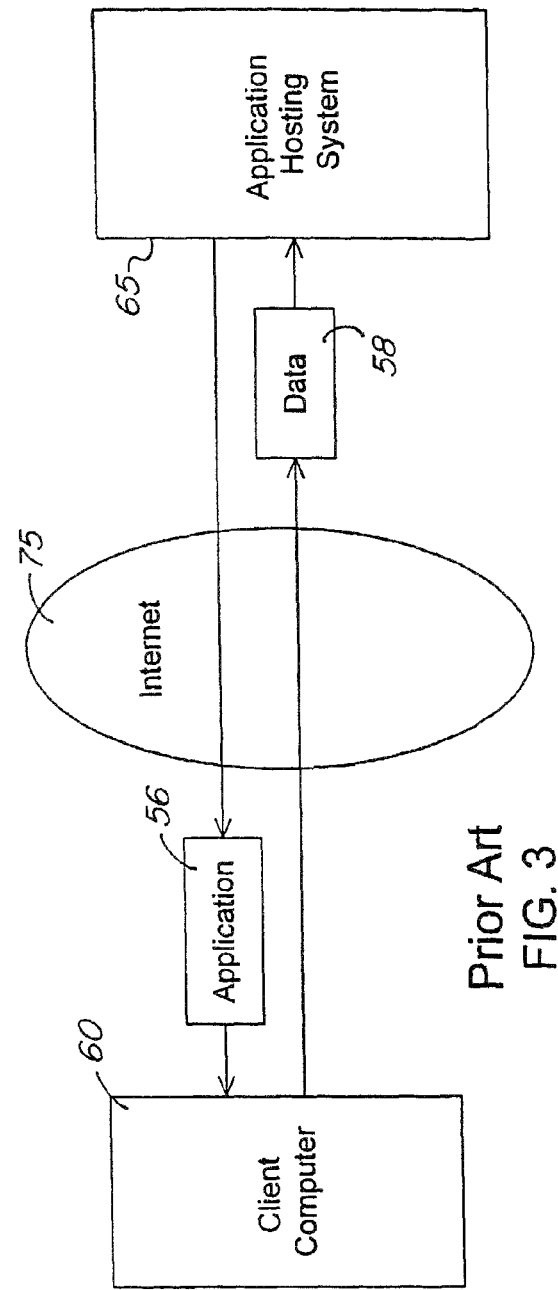
Prior Art
FIG. 2
Prior Art
FIG. 3

INTERNET-BASED DATA PROCESSING SYSTEM WITH ONSITE BACKUP

CROSS-REFERENCE TO RELATED APPLICATIONS

This application is a continuation of U.S. patent application Ser. No. 11/223,335 filed Sep. 9, 2005, which is a continuation of U.S. patent application Ser. No. 09/706,651 filed Nov. 6, 2000, now U.S. Pat. No. 6,981,007, which is a continuation-in-part of U.S. patent application Ser. No. 09/610,709 filed Jul. 7, 2000, now abandoned, which claims the benefit of the filing date of U.S. Provisional Patent Application Ser. No. 60/143,093 filed Jul. 9, 1999.

FIELD OF THE INVENTION

The invention relates to outsourced, Internet-based data processing and more particularly to safeguarding customer/client data when a business outsources data processing to third party Internet-based systems.

BACKGROUND OF THE INVENTION

In an effort to improve customer service, companies are increasingly moving their data processing systems onto the Internet and providing web interfaces for their customers to see and manipulate their own data. Examples include my prior U.S. Pat. No. 5,895,468 and related U.S. application Ser. No. 09/237,521 (now U.S. Pat. No. 6,049,801). Many other Internet based order entry and payment billing systems also exist.

Also companies are or soon will be outsourcing data processing for their own customers to third parties who, for example, develop and host the companies' web sites. This cuts costs and relieves companies of having to hire software expertise to service their customers and also relieves them of having to maintain hardware for scalability and to prevent service outages which erode customer confidence in the company. Further, hardware can be located in one place to minimize maintenance and bandwidth costs, while software and data entry can be located in one or multiple places where it is least expensive and can offer 24/7 coverage.

One difficulty companies face when considering whether to outsource data-processing to third party, Internet-based systems is the safeguarding of their and their clients' data. This problem is exacerbated when the company has a duty or professional responsibility to safeguard the data, such as a publicly traded company, law firm or medical practice. Another difficulty companies face in considering to outsource is continuity of service if, for example, the third party were to go out of business.

Many companies who currently perform their own data processing and are sensitized to the need to safeguard their and their customers' data have recently connected their LANs to the Internet, and are beginning to use third-party, Internet-based backup services (see FIG. 2). This provides a prudent off-site backup but does not offer the benefits of outsourcing the data processing to the Internet. Internet data backup companies include, inter alia, and Storage Tek.

Internet-based application service providers, so-called "ASPs" are known and provide the advantage that hardware and software maintenance and upgrades are centrally managed by a third party and not by each user or each LAN (see FIG. 3). User data may even be stored on the internet site, however, the data is still entered and manipulated by each user on his LAN/computer and the data manipulation and reporting is handled by each user on his LAN/computer.

What is desired, therefore, is an Internet-based data processing system which safeguards data providing an incentive for companies to outsource their data processing. Safeguarding applications, and especially any user customized settings, would also be desirable.

SUMMARY OF THE INVENTION

It is an object of the invention to safeguard the integrity of client data in an Internet-based data processing system or business.

Another object of the invention is to provide third party Internet-based data processing in which clients have access to and control over their own data.

A further object of the invention is to provide an Internet-based data processing system in which clients can obtain a copy of their data for on-site backup.

Yet another object of the invention is to provide a system of the above character in which the backup is provided in a format other than that used by the third party data processing system.

Yet a further object of the invention is to provide a system of the above character in which the data is encrypted to protect its confidentiality.

Still another object of the invention is to safeguard the third-party data processing software for use by the client in the event the third party were to go out of business.

These and other objects and advantages will become more apparent from the following detailed description considered with reference to the accompanying drawings.

BRIEF DESCRIPTION OF THE DRAWINGS

FIG. 2 is a block diagram of prior art systems providing Internet backup for data processing on clients' sites.

FIG. 3 is a block diagram of prior art systems providing Internet hosting of application and storage of data.

DETAILED DESCRIPTION OF THE INVENTION

Figure 1:
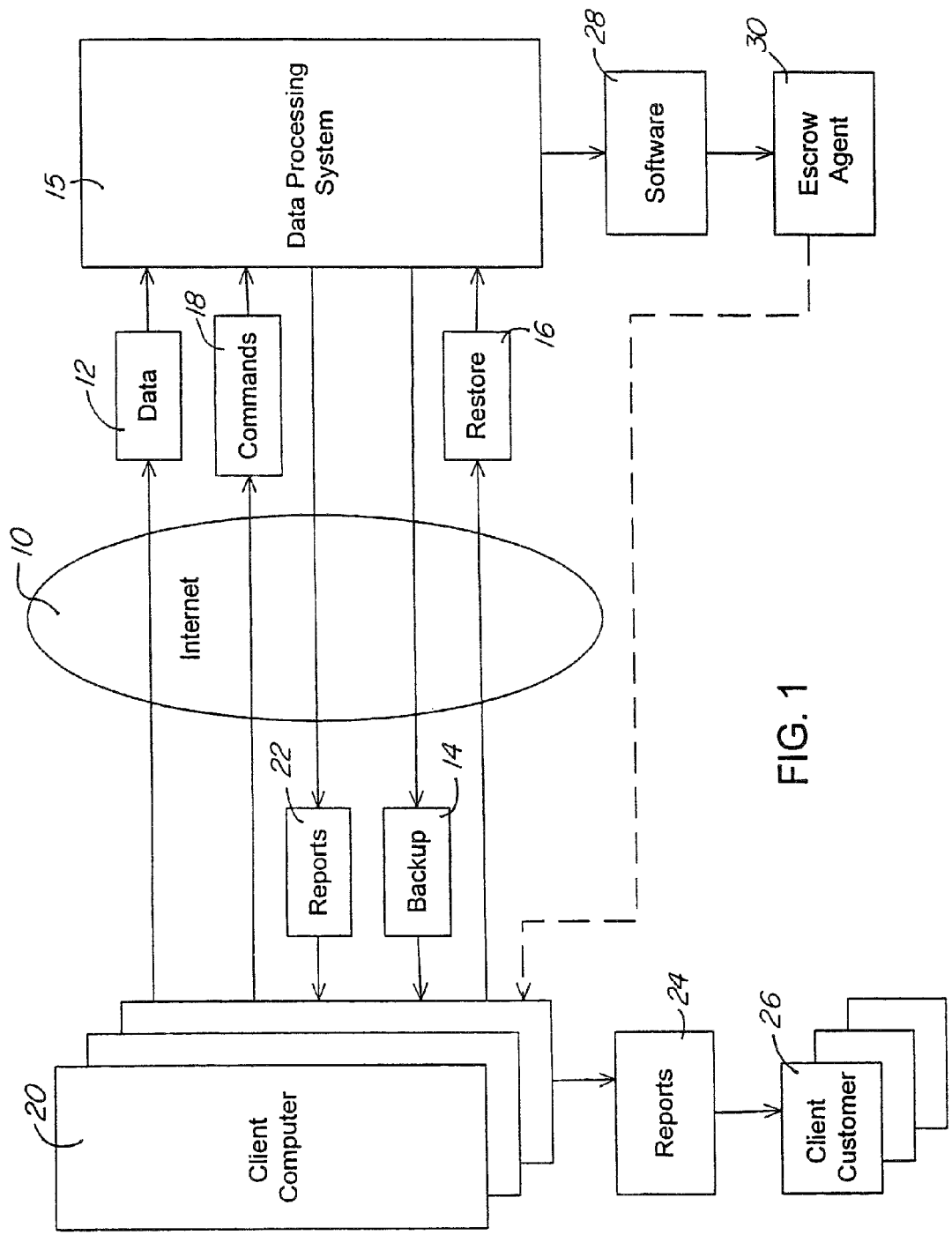
FIG. 1 is a block diagram of an Internet-based data processing system providing backup on clients' sites.

FIG. 1 is a block diagram of an Internet-based data processing system providing backup on clients' sites. The client computer 20 and data processing system 15 are connected by an Internet communications link 10. The client computer 20 executes software (FIG. 4 No. 38), residing on the data processing system 15, for storing data on the data processing system. The client computer 20 executes software, residing on the data processing system 15, for displaying, updating, and deleting data 12 stored on the central data processing system 15. The data processing system 15 transmits 14 a copy of stored data to the client computer 20. The client computer 20 issues commands 18 for transmitting (restoring) data 16 back to the data processing system 15. The client computer 20 executes software (FIG. 4 No. 38), residing on the data processing system 15, requesting reports from the data processing system 15. The data processing system 15 transmits reports 22 to the client computer 20. The client computer can generate reports 24 and transmit said generated reports to a client customer 26.

FIG. 2 is a block diagram of prior art systems providing Internet backup for data processing on clients' sites. The client computer 50 and data backup system 55 are connected by an Internet communications link 70. Data displayed, manipulated, and deleted (not shown) by the client computer 50 is stored on the client computer 50. The client computer 50 executes software for transmitting a copy of data 52 to the data backup system 55. The client computer executes software for retrieving data 54 stored on the data backup system 55. There is no onsite backup of data for the client computer 50 to retrieve.

FIG. 3 is a block diagram of prior art systems providing Internet hosting of application and storage of data. The client computer 60 and application hosting system 65 are connected by an Internet communications link 75. Data displayed, manipulated, and deleted (not shown) by the client computer 60 is stored on the application hosting system 65. There is no onsite backup of data for the client computer 60 to access.

Figure 4:
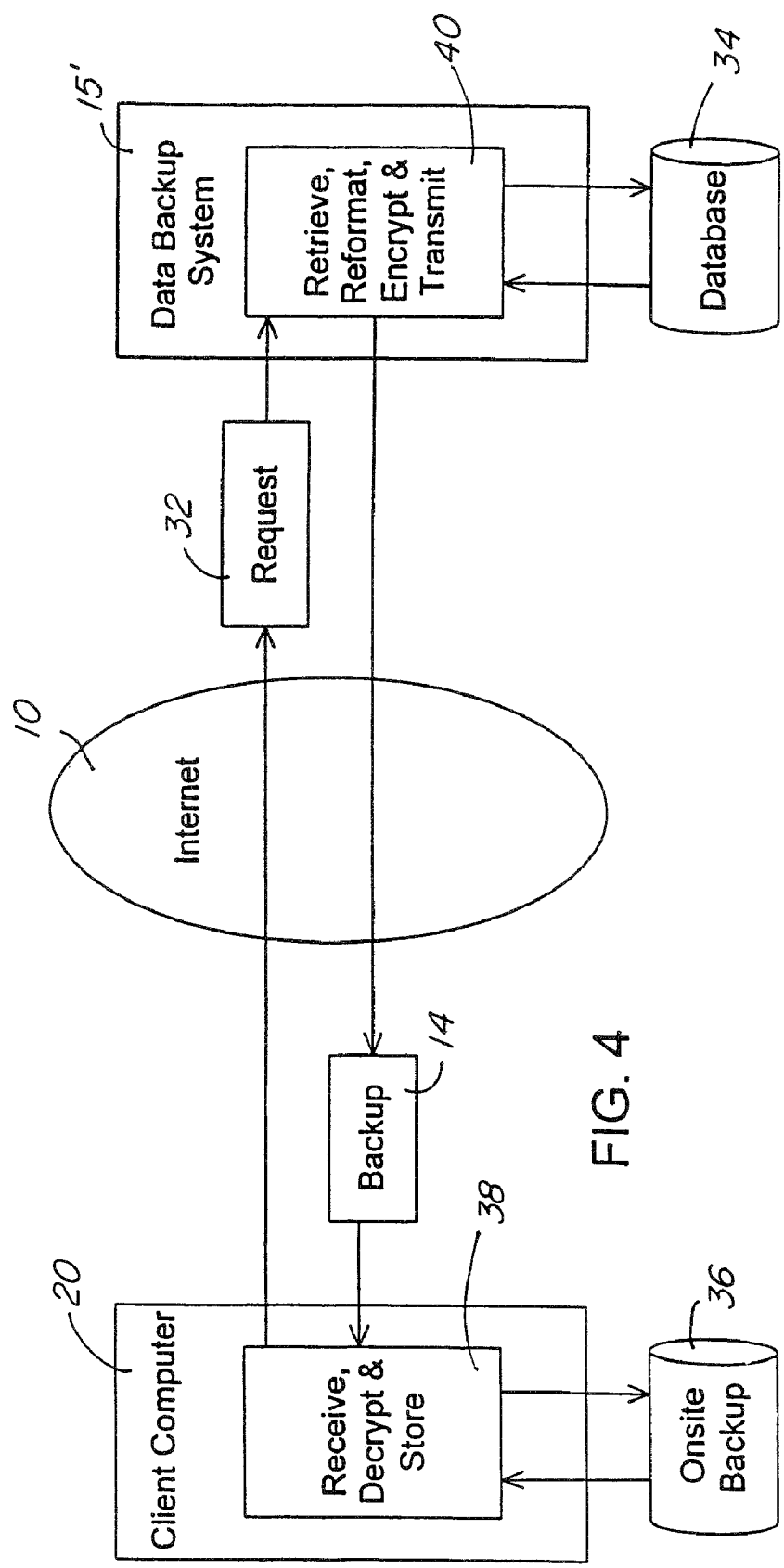
FIG. 4 is a block diagram of the system of FIG. 1 illustrating additional format conversion and encryption features.

FIG. 4 is a block diagram of the system of FIG. 1 illustrating additional format conversion and encryption features. This additional feature allows a client to back-up data on-site that is securely stored in a plurality of formats the client may require. The client computer 20 transmits a request 32 to the data backup system 15'. The data backup system 15' accesses data (stored on the data backup system 34), reformats the data, encrypts the data, and transmits the data 40, 14 to the client computer 20. The client computer 20 receives, decrypts, and stores 38 the data onsite 36.

It is to be understood that although specific embodiments of the invention have been described herein in detail, such description is for purposes of illustration only and modifications may be made thereto by those skilled in the art within the scope of the invention.

What is claimed is:

1. An Internet-based data processing system with onsite backup, comprising:
   a central computer;
   a client computer at a client site;
   a communications link between said central computer and the Internet;
   a communications link between said client computer and the Internet;
   at least one database containing a plurality of data records accessible by said central computer;
   a plurality of client identifiers, wherein each of the plurality of data records is associated with one of said client identifiers;
   data processing software executing on said central computer for processing the plurality of data records;
   a web interface on said client computer for controlling said data processing software to view and manipulate the plurality of data records via the Internet from said client computer;
   software executing on said central computer for receiving, from said client computer, a data backup request for at least one of the data records;
   software executing on said central computer for reformatting and encrypting the at least one data record prior to the data backup of the at least one data record being sent from said central computer to the client site;
   software executing on said central computer for transmitting said data backup of the at least one data record to the client site for storage in location accessible via said client computer;
   wherein the location is accessible via said client computer without using said communications link between said client computer and the Internet; and
   wherein the system further comprises software for receiving a command from said client computer to transmit said data backup of the at least one data record to said central computer to restore the at least one data record in said at least one database.

2. The system according to claim 1, wherein said data backup request is sent via said web interface.

3. The system according to claim 1, further comprising:
   software executing on said central computer for receiving a data format request from said client computer, and wherein the at least one data record is reformatted by said central computer to a format corresponding to said data format request.

4. The system according to claim 1, wherein said data format request is received via said web interface.

5. The system according to claim 1, wherein the at least one data record is reformatted to one of a plurality of formats prior to the data backup being sent from said central computer to the client site.

6. The system according to claim 1, wherein said data backup of the at least one data record is provided in a format other than a format used by said data processing software for the at least one data record.

7. An Internet-based data processing system with onsite backup, comprising:
   a central computer;
   a client computer at a client site;
   a communications link between said central computer and the Internet;
   a communications link between said client computer and the Internet;
   at least one database containing a plurality of data records accessible by said central computer;
   a plurality of client identifiers, wherein each of the plurality of data records is associated with one of said client identifiers;
   data processing software executing on said central computer for processing the plurality of data records;
   a web interface on said client computer for controlling said data processing software to view and manipulate the plurality of data records via the Internet from said client computer;
   software executing on said central computer for receiving commands from said client computer via said web interface, for receiving data from said client computer via said web interface, and for storing said received data in said database;
   software executing on said central computer for receiving a data backup request and a data format request, indicative of one of a plurality of formats, from said client computer via said web interface;
   software executing on said central computer for retrieving data corresponding to the data backup request from said database and for reformatting the data corresponding to the data backup request to a format corresponding to said data format request prior to the data corresponding to the said data backup being transmitted from said central computer to the client site;
   software executing on said central computer for encrypting the data corresponding to the said data backup;
   software executing on said central computer for transmitting the data corresponding to the said data backup to the client site for storage in location accessible via said client computer, wherein the location is accessible via said client computer without using said communications link between said client computer and the Internet;
   software executing on said client computer for decrypting the data corresponding to the said data backup; and wherein the system further comprises software for transmitting the data corresponding to the said data backup to said central computer in response to one of the commands received from said client computer to restore the data corresponding to the data backup request in said at least one database.

8. The system according to claim 7, wherein data corresponding to the data backup request is provided in a format other than a format used by said data processing software for the data corresponding to the data backup request.

9. An Internet-based data processing system with onsite backup, comprising:

a central computer connected to the Internet;

at least one storage having a plurality of client data records, said at least one storage accessible by said central computer;

a plurality of client identifiers, wherein each of the plurality of client data records is associated with one of said client identifiers;

data processing software executing on said central computer for processing the plurality of client data records;

a web interface, accessible via the Internet on a client computer at a client site, for controlling said data processing software to view and manipulate the plurality of client data records via the Internet from said client computer;

a client data request, sent from said client computer via the Internet to said central computer;

client data corresponding to said client data request, sent from said central computer via the Internet to the client site and saved in a location accessible via said client computer;

wherein the location is accessible via said client computer without using the Internet;

wherein said client data is reformatted to one of a plurality of formats prior to said client data being sent from said central computer to the client site; and wherein the system further comprises software for receiving a command from said client computer via said web interface to transmit the client data corresponding to said client data request to said central computer to restore the client data corresponding to said client data request in said at least one storage.

10. The system according to claim 9, wherein said client data request is sent via said web interface.

11. The system according to claim 9, wherein said client data is encrypted prior to being sent to the client site.

12. The system according to claim 9, further comprising a data format request, sent from the client computer via said web interface to said central computer.

13. The system according to claim 12, wherein said central computer reformats said client data to a format corresponding to said data format request.

14. The system according to claim 9, wherein said client data is provided to the client site in a format other than a format used by said data processing software for said client data.

* * * * *